(12) United States Patent
Jain et al.

(10) Patent No.: US 11,046,256 B2
(45) Date of Patent: Jun. 29, 2021

(54) SYSTEMS AND METHODS FOR CANCELING ROAD NOISE IN A MICROPHONE SIGNAL

(71) Applicant: Bose Corporation, Framingham, MA (US)

(72) Inventors: Ankita D. Jain, Westborough, MA (US); Cristian M. Hera, Lancaster, MA (US); Elie Bou Daher, Marlborough, MA (US); Ben John Feng, Sudbury, MA (US)

(73) Assignee: Bose Corporation, Framingham, MA (US)

( * ) Notice: Subject to any disclaimer, the term of this patent is extended or adjusted under 35 U.S.C. 154(b) by 100 days.

(21) Appl. No.: 16/443,215

(22) Filed: Jun. 17, 2019

(65) Prior Publication Data

US 2020/0391670 A1    Dec. 17, 2020

(51) Int. Cl.
*B60R 11/02* (2006.01)
*H04R 3/04* (2006.01)
*H04R 1/08* (2006.01)
*H04R 1/22* (2006.01)

(52) U.S. Cl.
CPC .......... *B60R 11/0247* (2013.01); *H04R 1/083* (2013.01); *H04R 1/222* (2013.01); *H04R 3/04* (2013.01)

(58) Field of Classification Search
CPC ..... B60R 11/0247; H04R 1/083; H04R 1/222; H04R 3/04
See application file for complete search history.

(56) References Cited

U.S. PATENT DOCUMENTS

| 8,625,775 B2 * | 1/2014 | Bhaskar ................ H04M 9/082 |
| | | 379/406.01 |
| 10,200,540 B1 | 2/2019 | Hera et al. |
| 10,600,400 B2 * | 3/2020 | True ................. G10K 11/17823 |

FOREIGN PATENT DOCUMENTS

| WO | 2000014731 | 3/2000 |
| WO | 2018158288 | 9/2018 |

OTHER PUBLICATIONS

International Search Report and the Written Opinion of the International Searching Authority, International Application No. PCT/US2020/038058, pp. 1-8, dated Sep. 23, 2020.

* cited by examiner

*Primary Examiner* — Brian Ensey
(74) *Attorney, Agent, or Firm* — Bond, Schoeneck & King, PLLC

(57) ABSTRACT

An audio system, including an accelerometer positioned to produce an accelerometer signal representative of road noise within a vehicle cabin; a microphone disposed within the vehicle cabin such that the microphone receives the road noise and produces a microphone signal having a road-noise component; and a road-noise canceler, comprising a road-noise cancellation filter, configured to receive the accelerometer signal and the microphone signal and to minimize the road-noise component of the microphone signal according to the accelerometer signal, to produce an estimated microphone signal.

9 Claims, 6 Drawing Sheets

SYSTEMS AND METHODS FOR CANCELING ROAD NOISE IN A MICROPHONE SIGNAL

BACKGROUND

The present disclosure generally relates to systems and methods for road-noise cancellation in a microphone signal, and specifically to systems and methods for road-cancellation in a microphone signal, according to an accelerometer signal representative of road noise in a vehicle cabin.

SUMMARY

All examples and features mentioned below can be combined in any technically possible way.

According to an aspect, an audio system includes an accelerometer positioned to produce an accelerometer signal representative of road noise within a vehicle cabin; a microphone disposed within the vehicle cabin such that the microphone receives the road noise and produces a microphone signal having a road-noise component; and a road-noise canceler, comprising a road-noise cancellation filter, configured to receive the accelerometer signal and the microphone signal and to minimize the road-noise component of the microphone signal according to the accelerometer signal, to produce an estimated microphone signal.

In an example, the road-noise cancellation filter is configured to provide an estimated road-noise signal, based on the accelerometer signal, wherein the road-noise canceler is configured to subtract the estimated road-noise signal from the microphone signal, such that the road-noise component of the microphone signal is minimized.

In an example, the road-noise cancellation filter is a fixed filter.

In an example, the road-noise cancellation filter is an adaptive filter, configured to minimize an error signal.

In an example, the audio system further includes an echo-cancellation filter configured to minimize an echo component of the estimated microphone signal, resulting from an acoustic production of at least one acoustic transducer disposed within the vehicle cabin, to produce a residual signal.

In an example, the adaptive filter is included in a multi-channel adaptive filter further comprising an echo-cancellation filter configured to minimize an echo component of the microphone signal resulting from an acoustic production of at least one acoustic transducer disposed within the vehicle cabin.

In an example, the road-noise cancellation filter is configured to receive the microphone signal and the accelerometer signal, the road-noise cancellation filter being optimized to minimize the road-noise component of the microphone signal according to the microphone signal and the accelerometer signal.

According to an aspect, a method for canceling road noise in a microphone signal, comprising: receiving from an accelerometer an accelerometer signal representative of road noise within a vehicle cabin; receiving, from a microphone operably positioned within the vehicle cabin, the microphone signal having a road-noise component; and minimizing, with a road-noise cancellation filter, the road-noise component of the microphone signal according to the accelerometer signal, to produce an estimated microphone signal.

In an example, the step of minimizing comprises: generating, with the road-noise cancellation filter, an estimated road-noise signal, based on at the accelerometer signal, subtracting the estimated road-noise signal from the microphone signal, such that the road-noise component of the microphone signal is minimized.

In an example, the road-noise cancellation filter is a fixed filter.

In an example, the road-noise cancellation filter is an adaptive filter, wherein a plurality of coefficients of the adaptive filter are adapted to according to an error signal.

In an example, the method further includes minimizing, with an echo-cancellation filter, an echo component of the estimated microphone signal, resulting from an acoustic production of at least one acoustic transducer disposed within the vehicle cabin, to produce a residual signal.

In an example, the method further includes minimizing, with an echo-cancellation filter being included together with the adaptive filter in a multi-channel adaptive, an echo component of the microphone signal resulting from an acoustic production of at least one acoustic transducer disposed within the vehicle.

In an example, the step of minimizing the road-noise component of the microphone signal is performed according to both the accelerometer signal and the microphone signal.

According to another aspect, a nontransitory storage medium storing program code that, when executed by a processor, includes the steps of: receiving from an accelerometer an accelerometer signal representative of road noise within a vehicle cabin; receiving, from a microphone operably positioned within the vehicle, a microphone signal having a road-noise component; and minimizing, with a road-noise cancellation filter, the road-noise component of the microphone signal according to the accelerometer signal, to produce an estimated microphone signal.

In an example, the step of minimizing comprises: generating, with the road-noise cancellation filter, an estimated road-noise signal, based on the accelerometer signal, subtracting the estimated road-noise signal from the microphone signal, such that the road-noise component of the microphone signal is minimized.

In an example, the road-noise cancellation filter is a fixed filter.

In an example, the road-noise cancellation filter is an adaptive filter, wherein a plurality of coefficients of the adaptive filter are adapted to according to an error signal.

In an example, the program code further includes the step of minimizing, with an echo-cancellation filter, an echo component of the estimated microphone signal, resulting from an acoustic production of at least one acoustic transducer disposed within the vehicle cabin, to produce a residual signal, wherein the error signal is the residual signal.

In an example, the program code further includes the step of minimizing, with an echo-cancellation filter being included together with the adaptive filter in a multi-channel adaptive, an echo component of the microphone signal resulting from an acoustic production of at least one acoustic transducer disposed within the vehicle cabin.

The details of one or more implementations are set forth in the accompanying drawings and the description below. Other features, objects, and advantages will be apparent from the description and the drawings, and from the claims.

DETAILED DESCRIPTION

Figure 1A:
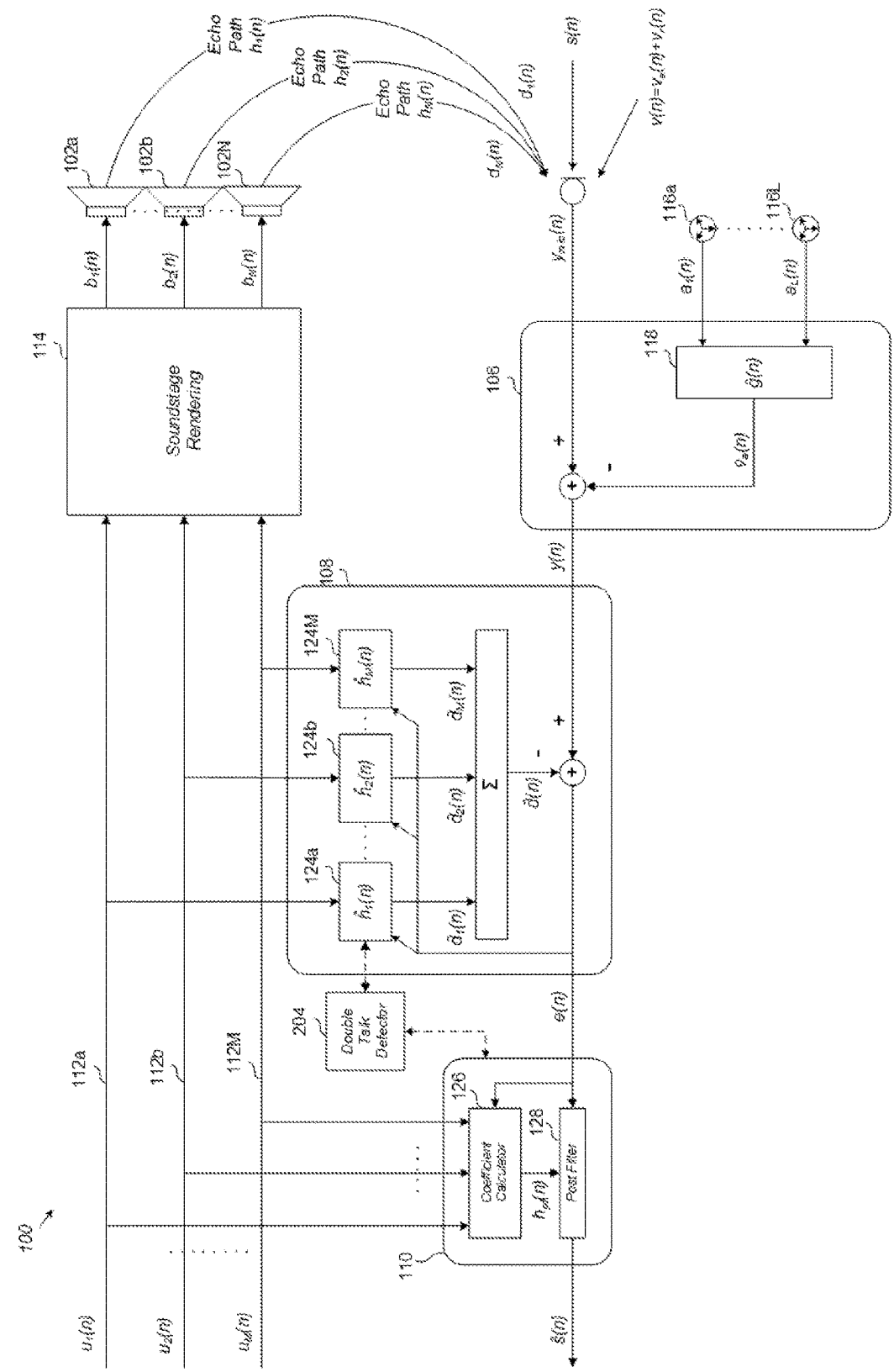
FIG. 1A depicts a schematic of an audio system including a road-noise canceler for canceling a road-noise component of a microphone signal, according to an example.

A handsfree phone system, implemented in a vehicle, will include a microphone positioned within the vehicle to receive the user's voice. The signal from the microphone is then, typically, routed to a mobile device. Because the microphone is located within the vehicle cabin, road noise resulting from vibrations of the vehicle structure will be present and detectable within the microphone signal. Road noise in the microphone signal will be audible to a user receiving the call and will generally degrade the quality of the call. Accordingly, there exists a need in the art for a method of minimizing the presence of road noise in the microphone signal sent to a handsfree phone system.

Various examples described herein are directed to systems and methods for minimizing the presence of road noise in the microphone signal by utilizing accelerometer signals representative of the road noise in the vehicle cabin. FIG. 1 illustrates an example of an audio system 100, typically implemented in a vehicle, that includes one or more acoustic transducers 102, one or more microphones 104, and audio processing subsystems such as a road-noise canceler 106, an echo canceler 108, and a post filter subsystem 110. The audio system 100 receives one or more content signals u(n), over one or more channels 112. The program content signals u(n) may be a single type of program content signal, such as a voice signal, presented over multiple channels 112 (e.g., channel 112a and 112b) as, for example, a left and right pair. Alternatively, or in combination, multiple types of program content signals u(n), such as voice, navigation, or music, may each be presented over one or more channels 112. The program content signals u(n) may be analog or digital signals and may be provided as compressed and/or packetized streams, and additional information may be received as part of such a stream, such as instructions, commands, or parameters from another system for control and/or configuration of addition processing such as soundstage rendering 114, the road-noise canceler 106, or other components.

The content signals are converted into an acoustic signal by the one or more acoustic transducers 102. The acoustic transducer(s) 102 may have further processing components, such as soundstage rendering 114, which provides various processing, such as equalization and loudspeaker routing, to drive the acoustic transducer(s) 102, in order to generate acoustic sound fields in accordance with the various content signals and sound stage parameters. In an example, one or more acoustic transducers 102 may be disposed within the vehicle cabin, each of the acoustic transducer(s) 102 being located within a respective door of the vehicle and configured to project sound into the vehicle cabin. Alternatively, or additionally, acoustic transducers 102 may be located within a headrest or elsewhere in the vehicle cabin.

The block diagrams illustrated in the figures, such as the example audio system 100 of FIGS. 1-4, are schematic representations and not necessarily illustrative of individual hardware elements. For instance, in some examples, each of the road-noise canceler 106, the echo canceler 108, the post filter subsystem 110, and the soundstage rendering 114 and other components and/or any portions or combinations of these, may be implemented in one set of circuitry, such as a digital signal processor, a controller, or other logic circuitry, and may include instructions stored on a non-transitory storage medium for the circuitry to perform the functions described herein. In an alternative example, various portions or combinations of these may be distributed across various sets of circuitry.

A microphone, such as microphone 104, may receive each of: an acoustic voice signal s(n) from a user, a noise signal v(n), an acoustic echo signal d(n) and other acoustic signals such as background noise within the vehicle. The microphone 104 converts acoustic signals into, e.g., electrical signals, and provides them to the road-noise canceler 106. Specifically, microphone 104 provides a voice signal s(n), when a user is speaking, a noise signal v(n) at least when the vehicle is moving, and an echo signal d(n), (i.e., the component of the combined signal that results from the acoustic production of the acoustic transducer(s) 102) when acoustic transducers 102 are active, as part of a combined signal $y_{mic}(n)$ to the road-noise canceler 106. The acoustic road-noise signal v(n), will include, at least, components related to the road noise, $v_a(n)$ (i.e., the acoustic signals within the vehicle cabin that result from the structure of the vehicle vibrating as the vehicle travels over a road or other surface, or resulting from the vibrations of the engine) and wind noise, $v_r(n)$ (i.e., the acoustic signals within the vehicle cabin that result from air passing over the vehicle as the vehicle travels). (The argument n, in this disclosure, is representative of a discrete-time signal.)

The road-noise canceler 106 functions to attempt to remove or minimize the road-noise component $v_a(n)$ from the combined signal $y_{mic}(n)$ to provide a road-noise canceled signal y(n). In one example, the road-noise canceler 106 works to remove the road-noise component $v_a(n)$ by processing the accelerometer signal(s) a(n), received from, e.g., one or more accelerometers 116, through a road-noise cancellation filter 118 to produce an estimated road-noise signal $\hat{v}_a(n)$. The estimated road-noise signal $\hat{v}_a(n)$ is, in at least one example, the estimation of the road noise existing at microphone 104, based on the road-noise measured at one or more accelerometers 116 operatively disposed about the vehicle to measure road noise.

"Accelerometer," as used herein, should be understood to encompass any sensor suitable for detecting vibrations in the vehicle structure resulting from the travel of the vehicle across a road or other surface or resulting from the vibration of the engine, which are transduced into a sound within a vehicle cabin.

The estimated road-noise signal $\hat{v}_a(n)$ may then be subtracted from the combined signal $y_{mic}(n)$ provided by the microphone 104 such that the road-noise component $v_a(n)$ of the combined signal $y_{mic}(n)$ is minimized. Thus, if the road-noise cancellation filter 119 performs well at providing an estimated road-noise signal $\hat{v}_a(n)$, road-noise canceler 106 will perform well at removing the road-noise component $v_a(n)$ from the combined signal $y_{mic}(n)$ provided by the microphone 104.

As shown in FIG. 1A road-noise cancellation filter 118 may be a fixed filter configured to apply a fixed set of coefficients to accelerometer signal(s) a(n) to generate estimated road-noise signal $\hat{v}_a(n)$. Road-noise cancellation filter 118 may be conceived of as applying a transfer function $\hat{g}(n)$, which is an estimate of the transfer function $g(n)$ between accelerometer(s) 116 and microphones 104, such that the accelerometer signal a(n), received at road-noise cancellation filter 118, is transformed by road-noise cancellation filter 118 into an estimate $\hat{v}_a(n)$ of road noise present at the microphone. Where, as shown in FIG. 1A, multiple accelerometer(s) 116 are used, estimated transfer function $\hat{g}(n)$ may be representative of an estimate of the sum of the transfer functions between each accelerometer 116 and microphone 104. For example, transfer function $\hat{g}(n)$ may be an estimate of the sum of the transfer function $\hat{g}_1(n)$ between accelerometer 116a and microphone 104 through transfer function $\hat{g}_L(n)$ between accelerometer 116L and microphone 104. The estimated road-noise signal $\hat{v}_a(n)$ is subtracted from the combined signal output of microphone(s) 104, resulting in a road-noise canceled signal microphone signal y(n). (It should be understood that road-noise canceled signal y(n) may still include a road-noise component; however, if working properly, the road-noise component $v_a(n)$ of road-noise canceled signal y(n) should be at least minimized with respect to the combined signal $y_{mic}(n)$.)

Figure 1B:
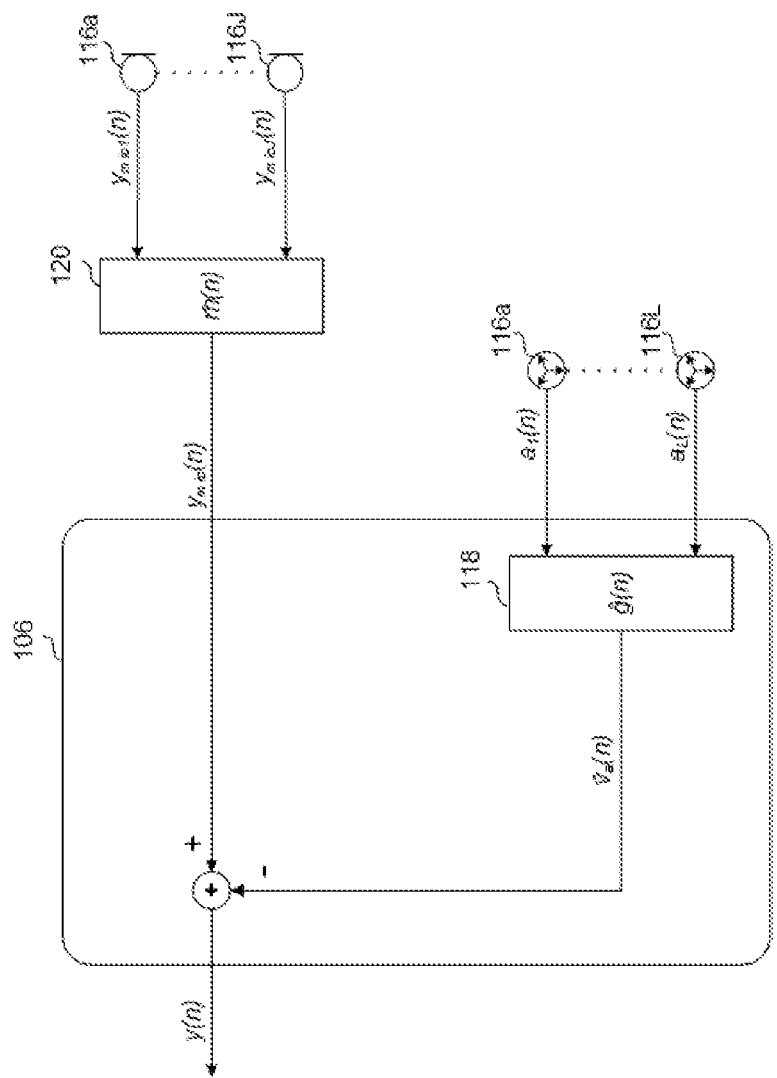
FIG. 1B depicts a partial schematic of an audio system including a road-noise canceler for canceling a road-noise component of a microphone signal, according to an example.

Likewise, if microphone 104 is an array of microphones, as shown, for example, in FIG. 1B, road-noise cancellation filter 118 may estimate the sum of the transfer functions from each accelerometer 116 to each respective microphone 104. Thus, for example, road-noise cancellation filter 118 may approximate the sum of the transfer functions $g_{1,1 \ldots 1, L}(n)$ from accelerometer 116a to microphone 104a through microphone 104J, repeated for each accelerometer through accelerometer 116L. Indeed, because the accelerometer(s) 116 and microphones 104 are spatially distributed at different locations about the vehicle, the transfer functions from each accelerometer to each respective microphone may vary and thus may be conceived of as the transfer function $\hat{g}(n)$ between each accelerometer and each microphone. Estimated transfer function $\hat{g}(n)$ may, alternatively, be conceived as a transfer function between each accelerometer 116 to an equivalent microphone (i.e., a combined microphone comprising microphones 104), the nature of the equivalent microphone being determined by the spatial relationship of microphones 104.

In practice, the coefficients of the road-noise cancellation filter 118 (and consequently, estimated transfer function $\hat{g}(n)$) may be determined empirically, according to suitable methods (e.g., combinatorial signal processing), in order to minimize the road-noise component of road-noise canceled signal y(n). For example, a vehicle, including both microphone(s) 104 and accelerometer(s) 116 may be driven over a variety of road surfaces and the signals from both recorded. From this data, a set of optimized coefficients may be determined that generate an estimated road-noise signal $\hat{v}_a(n)$ that, on average, minimizes the road-noise component $v_a(n)$ of the combined signal $y_{mic}(n)$ when subtracted from combined signal $y_{mic}(n)$.

As shown in FIG. 1B the microphone signals $y_{mic1 \ldots micJ}(n)$, output from microphones 104 may likewise be input to a fixed microphone filter 120 implementing a transfer function $\hat{m}(n)$. Microphone filter 120 may be configured to combine microphone signals $y_{mic1 \ldots micN}(n)$ into a single microphone signal $y_{mic}(n)$, and to apply any other necessary or useful signal processing, such as projecting microphones 104 to a location near a user's mouth. To the extent that such signal processing is applied by microphone filter 120, the estimated transfer function $\hat{g}(n)$ may represent the estimated transfer function between each accelerometer 116 and the projected location(s) of each microphones 104. Alternatively, or additionally, microphone filter 120 may steer beams toward sources of desired acoustic signals and/or away from noise sources, and may additionally or alternately steer nulls toward noise sources.

In practice, when using a microphone filter 120, the coefficients of road-noise cancellation filter 118 may be empirically determined, in the same way as the above methods, to minimize road-noise component of $y_{mic}(n)$ to yield road-noise canceled signal y(n). Although microphone filter 120 is shown in conjunction with FIG. 1B, it should be understood that a similar microphone filter may be implemented together with any example including a microphone described herein.

Figure 1C:
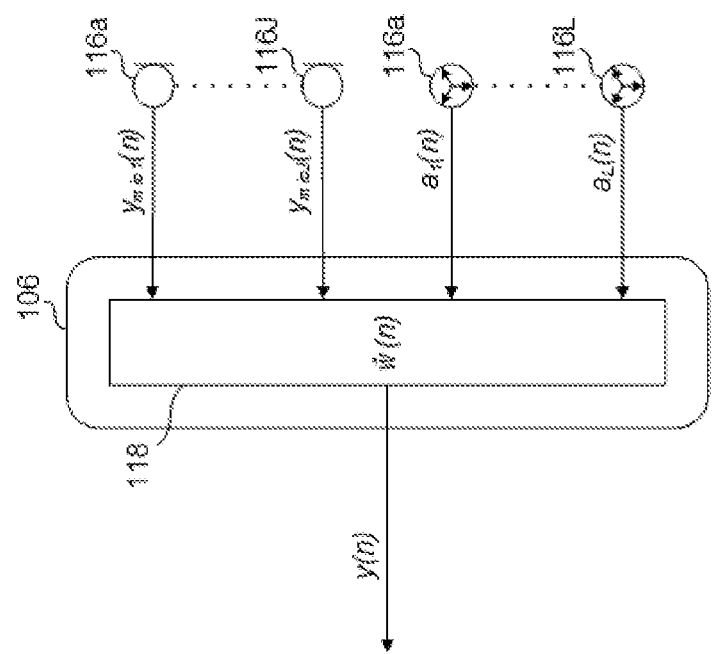
FIG. 1C depicts a partial schematic of an audio system including a road-noise canceler for canceling a road-noise component of a microphone signal, according to an example.

As shown in FIG. 1C, in an alternative example, road-noise canceler 106 may be implemented as a filter configured to receive the combined signal(s) $y_{mic}(n)$ from microphone(s) 104 and road-noise signal(s) a(n) from accelerometer(s) 116, and to implement an estimated transfer function $\hat{w}(n)$ that, based on the relationships between accelerometer(s) 116 and microphone(s) 104, is optimized to minimize the road-noise component of road-noise canceled signal y(n). In this example, road-noise canceler 106 does not subtract an estimated road-noise signal from $y_{mic}(n)$, but rather generates y(n) directly, with road-noise cancellation filter 118 using inputs from microphone(s) 104 and accelerometer(s) 116. Road-noise cancellation filter 118 may be empirically optimized to achieve the minimization of the road-noise component $v_a(n)$ of the combined signal $y_{mic}(n)$, as in the above examples. For example, a vehicle, including both microphone(s) 104 and accelerometer(s) 116 may be driven over a variety of road surfaces and the signals from both recorded. From this data, a set of optimized coefficients may be determined, according to any suitable array processing method, that, on average, minimize the road-noise component $v_a(n)$ of the combined signal $y_{mic}(n)$.

Figure 2:
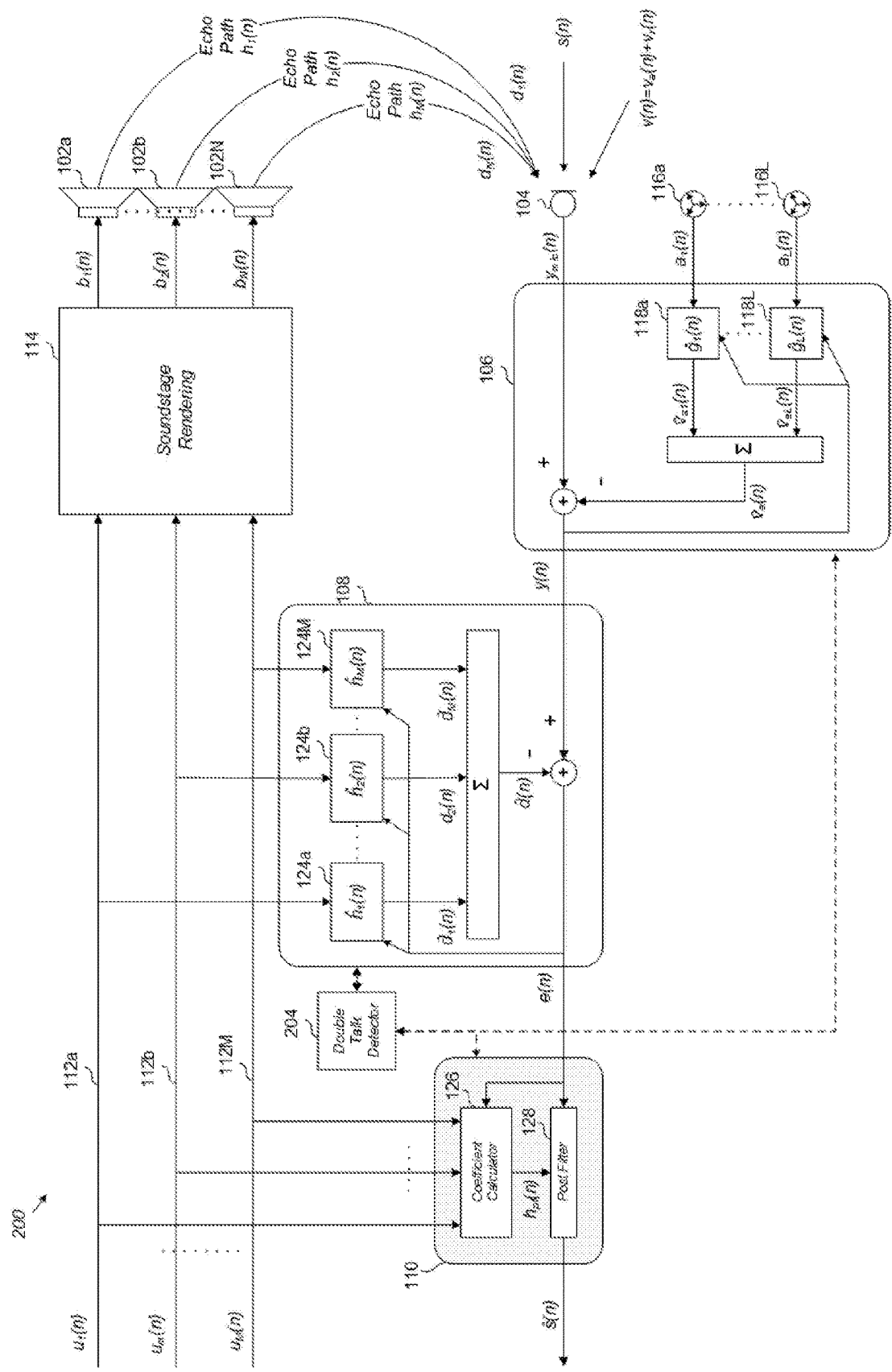
FIG. 2 depicts a schematic of an audio system including an adaptive road-noise canceler for canceling a road-noise component of a microphone signal, according to an example.

Turning to FIG. 2, there is shown an alternate example audio system 200 in which road-noise canceler 106 comprises one or more adaptive road-noise cancellation filter(s) 118 that, according to an adaptive algorithm, converge on satisfactory parameters that produce sufficiently accurate estimated road-noise signal. Like the examples of FIGS. 1A and 1B, road-noise cancellation filter 118 may apply a set of filter coefficients to the accelerometer signal(s) a(n) to produce the estimated road-noise signal $\hat{v}_a(n)$. The coefficients of the adaptive road-noise cancellation filter(s) 118 may be updated according to the adaptive algorithm in order to minimize an error signal (here, shown as the road-noise canceled signal y(n)). Examples of adaptive algorithms that may be employed include, for example, a least mean squares (LMS) algorithm, a normalized least mean squares (NLMS) algorithm, a recursive least square (RLS) algorithm, or any combination or variation of these or other algorithms. The adaptive road-noise cancellation filter(s) 118 as adapted by the adaptive algorithm, converges to apply estimated transfer function $\hat{g}(n)$, which, as described above, is representative of the transfer function g(n) between accelerometer(s) 116 and microphone(s) 104, such that the accelerometer signal a(n), received at road-noise cancellation filter(s) 118, is transformed by road-noise cancellation filter 118 into an estimate $\hat{v}_a(n)$ of road noise present at the microphone.

As shown in FIG. 2, the multiple adaptive road-noise cancellation filters 118 may, together, form a multichannel adaptive filter. Each constituent road-noise cancellation filter 118 of the multichannel adaptive filter is associated with (that is, receives a signal from) a respective accelerometer 116. For example, adaptive road-noise cancellation filter 118a is associated with and receives a signal $a_1(n)$ from accelerometer 116a and may apply a respective transfer function $\hat{g}_1(n)$ representative of the transfer function between accelerometer 116a and microphone 104. Likewise, the remaining adaptive filters 118L may be associated with and receive a signal $a_L(n)$ from accelerometer(s) 116L and apply a respective transfer function $\hat{g}_L(n)$ between the respective accelerometer 116L and microphone 104. The respective transfer functions of each adaptive road-noise cancellation filter 118 is adjusted to minimize an error signal, shown here as road-noise canceled signal y(n). The output of each adaptive road-noise cancellation filter 118 will, accordingly, represent an estimate of the road-noise at the microphone 104, based on the signal received from the associated accelerometer 116 and the estimated transfer function $\hat{g}(n)$ of the adaptive road-noise cancellation filter 118. The outputs of adaptive road-noise cancellation filters 118 may be summed to yield the estimated road-noise signal $\hat{v}_a(n)$.

In alternative embodiments, the road-noise cancellation filter 118 may be updated using the residual signal e(n) (at the output of echo canceler 108), or estimate voice signal ŝ(n), as this signal will contain fewer components that could interfere with the adaption and/or cause adaptive road-noise cancellation filter(s) 118 to diverge. In some examples, the adaptive algorithm may update the coefficients of each respective road-noise cancellation filter 118 according to the power of the reference signal received at the respective road-noise cancellation filter 118 relative to the sum of the powers of reference signals. For example, if the reference signal, accelerometer signal $a_1(n)$, received at adaptive filter 118a has a greater power than accelerometer signal $a_L(n)$ received at adaptive filter 118L, the coefficients of adaptive road-noise cancellation filter 118a will receive a larger update relative to the update of the coefficients of adaptive road-noise cancellation filter 118L. Thus, the channel most responsible for error observed in the road-noise canceled signal y(n) will receive the greatest update.

Generally, the adaptive algorithm updates the road-noise cancellation filter(s) 118 during times when the user is not speaking, but in some examples the adaptive algorithm may make updates at any time. To that end, double-talk detector 204 may detect when a user is speaking and instruct or otherwise cause adaptive road-noise cancellation filter(s) 118 to cease updating.

As shown in FIGS. 1 and 2, road-noise canceler 106 is implemented in conjunction with an echo canceler 108 and a post filter subsystem 110 (the functions and operations of which will be briefly described below). It should, however, be understood that, in various examples, the road-noise canceler 106 may be implemented without one or both of the echo-canceler or post-filter (to the extent that these subsystems function independently of road-noise canceler 106), and that the audio system 100, 200 of FIGS. 1 and 2 is merely provided as an example of an audio system in which the road-noise canceler may be implemented.

The echo canceler 108 functions to attempt to remove the echo signal from the road-noise canceled signal y(n) to provide residual signal e(n). The echo canceler 108 works to minimize the echo signal d(n) by processing the program content signals u(n) on channels 112 through one or more echo cancellation filter(s) 124 to produce an estimated echo signal $\hat{d}(n)$ which is subtracted from the signal provided by the microphone 104. In various alternative embodiments, the output of soundstage rendering 114, b(n), rather than program content signals u(n), may be used as the reference signal(s) for echo canceler 108. Indeed, any signal, correlated with at least one the program content signals u(n) and suitable for minimizing the presence the echo signal d(n) in the road-noise canceled signal y(n), may be used as a reference signal for echo canceler 108.

The echo canceler 108 may include an adaptive algorithm to update the adaptive echo cancellation filter(s) 124, at intervals, to improve the estimated echo signal $\hat{d}(n)$. Over time, the adaptive algorithm causes the adaptive echo cancellation filter(s) 124 to converge on satisfactory parameters that produce a sufficiently accurate estimated echo signal $\hat{d}(n)$ to minimize the error of residual signal e(n). Generally, the adaptive algorithm updates the adaptive echo cancellation filter(s) 124 during times when double talk detector 204 detects that the user is not speaking, but in some examples the adaptive algorithm may make updates at any time. When the user speaks, such is deemed "double talk," and the microphone 104 picks up both the acoustic echo signal d(n) and the voice signal s(n).

The adaptive echo cancellation filter(s) 124 may apply a set of filter coefficients to the program content signal u(n) to produce the estimated echo signal $\hat{d}(n)$. The adaptive algorithm may use any of various techniques to determine the filter coefficients and to update, or change, the filter coefficients to improve performance of the adaptive echo cancellation filter(s) 124. Such adaptive algorithms, whether operating on an active filter or a background filter, may include, for example, a least mean squares (LMS) algorithm, a normalized least mean squares (NLMS) algorithm, a recursive least square (RLS) algorithm, or any combination or variation of these or other algorithms. The echo cancellation filter(s) 124, as adapted by the adaptive algorithm, converges to apply an estimated transfer function $\hat{h}(n)$, which is representative of the response of the echo path between acoustic transducer(s) 102 and microphone(s) 104.

Generally speaking, as shown in, e.g., FIGS. 1 and 2, multiple echo cancellation filters 124 may together form a multichannel adaptive echo cancellation filter, each constituent echo cancellation filter 124 receiving an associated reference signal (e.g., program content signal u(n)). For example, adaptive echo-cancellation filter 124a is associated with and receives a signal $u_1(n)$ from program content channel 112a and may apply a respective transfer function $\hat{h}_1(n)$ representative of the echo path $h_1(n)$ (and the response of any additional processing, as will be described below). Likewise, the remaining adaptive echo-cancellation filters 124M each may be associated with and receive a signal(s) $u_M(n)$ from program content channel(s) 112M, and apply a respective transfer function(s) $\hat{h}_M(n)$. The respective transfer functions of each adaptive echo-cancellation filter 124 is adjusted to minimize an error signal, shown here as road-noise and echo canceled, residual signal e(n).

It should be understood that the number of adaptive echo-cancellation filters 124 will be dependent, generally, on the number of reference signals received. Thus, if the program content signals u(n) are used as reference signals, some M number of echo-cancellation filters 124 may be implemented, each echo-cancellation filter 124 being respectively associated with one of M program content signals u(n) whereas, if the soundstage rendering output b(n), is used, some N number of echo cancellation filters 124 may be implemented, each echo-cancellation filter 124 being respectively associated with one of N soundstage rendering outputs b(n). It should also be understood that, in some examples, a fewer number of adaptive echo-cancellation filters 124 than, e.g., program content signals u(n) or soundstage rendering outputs b(n), may be used. For example, fewer echo-cancellation filters 124 may be used if certain program content signals u(n), such as a set of woofer left, twiddler left, and twitter left program content signals u(n), are summed together and provided as a reference signal to a single echo-cancellation filter 124, or if only a subset of reference signals need to be used to achieve effective echo cancellation.

In addition to estimating the echo path h(n), estimated transfer function ĥ(n) may represent an estimate of any processing disposed between the location from which the reference signals (e.g., program content signals u(n)) are taken and echo canceller 108. Thus, where, as shown in FIG. 1A, the reference signals are program content signals u(n), the estimated transfer function ĥ(n) will represent the response of soundstage rendering 114, acoustic transducer(s) 102, microphone(s) 104, and any processing (such as array processing) associated with microphone(s) 104, in addition to the response of the echo path h(n). The estimated transfer function ĥ(n) is thus a representation of how the program content signal u(n) is transformed from its received form into the echo signal d(n), in conjunction with the response and any processing performed at microphone 104. If, however, the reference signals are taken at the output of soundstage rendering 114, b(n), the estimated transfer function ĥ(n) will collectively represent the response of acoustic transducer(s) 102, echo path h(n), microphone(s) 104, and any processing associated with microphone(s) 104. Thus, although FIGS. 1 and 2 depict M estimated echo signals d̂(n) rather than N estimated echo signals d̂(n), because the response of soundstage rendering 114 is included in estimated transfer function ĥ(n), each of estimated echo signals d̂(n) will include the processing of the associated program content signal u(n) by soundstage rendering 114. Accordingly, the sum of M estimated echo signals d̂(n) will estimate the sum of N echo signals d(n).

While the echo-canceler 108 typically cancels linear aspects of the microphone signal y(n) correlated to the program content channels, rapid changes and/or non-linearities in the echo path prevent the echo canceler 108 from providing a precise estimated echo signal, and a residual echo will thus remain in the residual signal e(n). The post filter subsystem 110 thus operates to suppress the residual echo component with spectral filtering to produce an improved estimated voice signal ŝ(n). Such post filters are generally known in the art, however a brief description of one example will be provided below.

As shown, the post filter subsystem 110 may include a coefficient calculator 126 and a post filter 128. The post filter 128 suppresses residual echo in the residual signal e(n) (from the echo canceler 108) by, in some examples, reducing the spectral content of the residual signal e(n) by an amount related to the likely ratio of the residual echo signal power relative to the total signal power (e.g., speech and residual echo), by frequency bin. In one example, the post filter 128 may multiply each frequency bin (represented by index "k") of the residual signal e(n) by a filter coefficient $H_{pf}(k)$, calculated by coefficient calculator 126, according to the following example equation:

$$H_{pf}(k) = \max\left\{1 - \beta \frac{\sum_{i=1}^{M}[|\Delta H_i(k)|^2 \cdot S_{u_i u_i}(k)]}{S_{ee}(k) + \rho}, H_{min}\right\} \quad (1)$$

where $\Delta H_i(k)$ is a spectral mismatch, $S_{ee}(k)$ is the power spectral density of the residual signal e(n), and $S_{u_i u_i}$ is the power spectral density of the program content signal u(n) on the i-th content channel. A minimum multiplier, $H_{min}$, is applied to every frequency bin, thereby ensuring that no frequency bin is multiplied by less than the minimum. It should be understood that multiplying by lower values is equivalent to greater attenuation. It should also be noted that in the example of equation (1), each frequency bin is at most multiplied by unity, but other examples may use different approaches to calculate filter coefficients. The β factor is a scaling or overestimation factor that may be used to adjust how aggressively the post filter subsystem 110 suppresses signal content, or in some examples may be effectively removed by being equal to unity. The ρ factor is a regularization factor to avoid division by zero.

The spectral mismatch $\Delta H_i(k)$ represents the spectral mismatch between the echo path h(n) and the acoustic echo canceler 108. The spectral mismatch $\Delta H_i(k)$ may be calculated as a ratio of the cross-power spectral density of the residual error signal e(n) and the program content signal on the i-th content channel $u_i(n)$ $S_{u_i e}$, to the power spectral density of the program content signal u(n) on the i-th content channel, $S_{u_i u_i}$ $$\Delta H_i = \frac{S_{u_i e}}{S_{u_i u_i}} \quad (2)$$

In some examples, the power spectral densities used may be time-averaged or otherwise smoothed or low pass filtered to prevent sudden changes (e.g., rapid or significant changes) in the calculated spectral mismatch.

It should be understood that Eqs. (1) and (2) are generally related to the case in which reference signals are uncorrelated. If the reference signals are not necessarily uncorrelated (e.g., a left and right channel pair share some common content), the coefficient calculator 126 may calculate the filter coefficient $H_{pf}(k)$ according to the following equation:

$$H_{pf}(k) = \max\left\{1 - \beta \frac{\Delta H^H(k) \cdot S_{uu}(k) \cdot \Delta H(k)}{S_{ee}(k) + \rho}, H_{min}\right\} \quad (3)$$

where $\Delta H^H$ represents the Hermitian of $\Delta H$, which is the complex conjugate transpose of $\Delta H$, and where $\Delta H$ is given by:

$$\Delta H = S_{uu}^{-1} S_{ue}. \quad (4)$$

$S_{uu}$ is the matrix of power spectral densities and cross power spectral densities of the program content channels. $\Delta H$ is the vector containing the spectral mismatch of all channels, and $S_{ue}$ is the vector containing the cross power spectral densities of each reference channel with the error signal.

Although the above equations have been provided for a post filter subsystem 110 configured to suppress residual echo from multiple content channels, in alternate examples, the post filter subsystem 110 may be configured to suppress the residual echo from only one content channel.

In various examples, the post filter subsystem 110 may be configured to operate in the frequency domain or the time domain. Accordingly, use of the term "filter coefficient" is not intended to limit the post filter subsystem 110 to operation in the time domain. The terms "filter coefficients," or other comparable terms, may refer to any set of values applied to or incorporated into a filter to cause a desired response or a desired transfer function. In certain examples, the post filter subsystem 110 may be a digital frequency domain filter that operates on a digital version of the estimated voice signal to multiply signal content within a number of individual frequency bins, by distinct values generally less than or equal to unity. The set of distinct values may be deemed filter coefficients.

It should be understood that, in various alternative examples, the road-noise canceler 106 may be positioned to receive the estimated residual error signal e(n), rather than the combined signal from microphone 104. That is to say that the road-noise canceler 106 may be placed after the echo canceler 108 in the processing chain. This may improve the performance of the road-noise canceler 106, as echo signal will either not be present or will be minimally present in the error signal used by the adaptive road-noise cancellation filter(s) 118 to adapt the filter coefficients.

In an example, road noise canceler 106 and echo canceler 108 may be sub-banded. That is to say, the road noise canceler 106 and echo canceler 108 may be duplicated, each duplicate being associated with a particular frequency band. The order of the road noise canceler 106 and echo canceler 108 in the processing chain, for each sub-band, may be determined by the Signal-to-Noise Ratio (SNR) of the echo signal d(n) to the road-noise component $v_a(n)$. For example, the combined signal $y_{mic}(n)$ may be filtered, e.g., with a low-pass filter, to create a low-frequency sub-band, e.g., <400 Hz. At that frequency range, the power of the road noise signal $v_a(n)$ will generally be higher than the power of the echo signal d(n) (i.e., the combined signal $y_{mic}(n)$ will generally have an SNR of <0 dB), accordingly, the road-noise canceler 106 may be positioned before the echo canceler 108 (i.e., in the order shown in FIGS. 1 and 2) in the processing chain. If the echo canceler were placed before the road-noise canceler 106 in this frequency band, the road-noise component $v_a(n)$ would dominate the error signal received at the echo canceler 108, preventing the echo canceler 108 from adapting properly.

Similarly, the combined signal $y_{mic}(n)$ may be filtered, e.g., with a bandpass filter, to a midrange of e.g., 400 Hz-1 kHz, in which the echo signal d(n) will dominate the combined signal $y_{mic}(n)$ (i.e., the combined signal $y_{mic}(n)$ will generally have an SNR of >0 dB). In this frequency band, the echo canceler 108 may be positioned in the processing chain before the road-noise canceler 106. Otherwise, the power of the echo signal d(n) in the combined signal $y_{mic}(n)$ would prevent road-noise canceller 106 from adapting properly.

Finally, the combined signal $y_{mic}(n)$ may be filtered, e.g., with a highpass filter, to a high-frequency band of e.g., >1 kHz, in which the echo signal d(n) will greatly dominate the combined signal $y_{mic}(n)$ (i.e., the combined signal $y_{mic}(n)$ will generally have an SNR of >>0 dB). In this example, the road-noise canceler 106 may be omitted entirely, to avoid needless processing.

It should be understood that the above frequency bands are merely provided as examples, to illustrate the concept that the order of the road-noise canceler 106 and the echo canceler 108 in the processing chain may be determined by the SNR of a particular frequency band. More specifically, for frequency bands in which the SNR is generally <0 dB, the road-noise canceler 106 may be positioned before the echo canceler 108. For frequency bands in which the SNR is generally >0 dB, the road-noise canceler 106 may be positioned after the echo canceler 108. And for frequency bands in which the SNR is generally >>0 dB, the road-noise canceler 106 may be omitted entirely.

Figure 3:
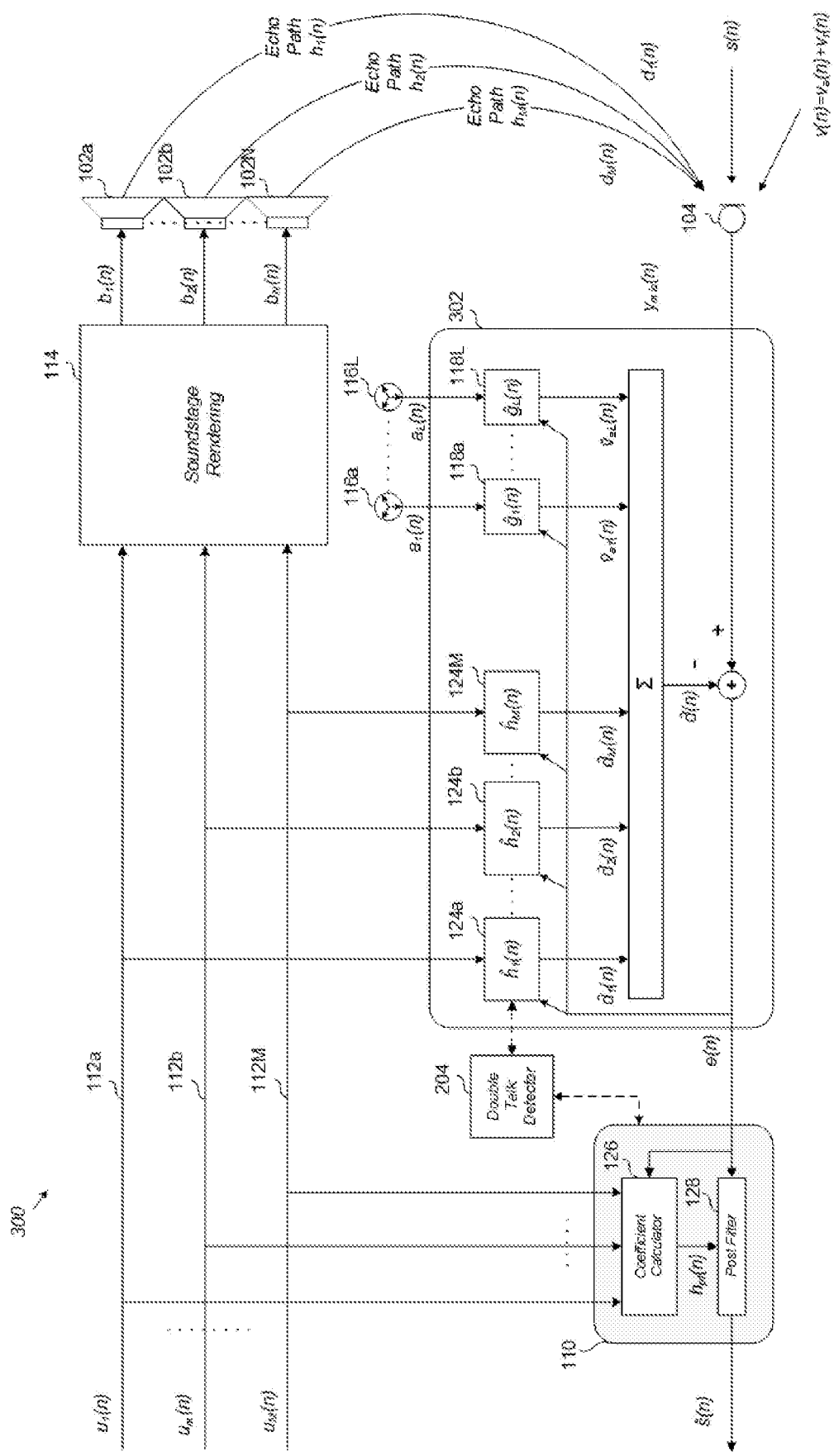
FIG. 3 depicts a schematic of an audio system including an adaptive road-noise canceler for canceling a road-noise component of a microphone signal combined with an echo canceler for canceling an echo component of a microphone signal, according to an example.

As described above, the adaptive filters 124, 118 of FIG. 2 may update the coefficients according to the power of the reference signal, relative to the sum of the powers of the each of the reference signals. However, because the road-noise cancellation adaptive filter(s) 118 is implemented separate from adaptive filter of echo canceler 108, adaptive road-noise cancellation filter(s) 118 will only compare the relative power of the signals received from accelerometer(s) 116. The error, however, present in the road-noise canceled signal y(n) may be in part, attributable to the echo received at microphone(s) 104, which is still present in road-noise canceled signal y(n). Accordingly, it is advantageous to combine the adaptive echo-cancellation filter 124 of echo canceler with the adaptive road-noise cancellation filter 118 of road-noise canceler into a combined multichannel adaptive filter 302, as shown in the audio system 300 of FIG. 3. The combined multichannel adaptive filter 302 will update the coefficients of each signal relative to the total power of the reference signals, including content program content signals u(n) and accelerometer signals a(n). For example, as shown in FIG. 3, the relative powers of program content signals $u_1(n)$, $u_2(n)$ through $u_M(n)$, and accelerometer signals $a_1(n)$, through $a_L(n)$ may be considered in calculating the coefficients for adaptive echo-cancellation filters 124a, 124b through 124M, and road-noise cancellation filters 118a through 118L. As described above, in an example, the size of the update to each adaptive filter may be proportional to the ratio of the power of the adaptive filters reference signal and the sum of the power of all the reference signals. Thus, for example, the size of the update of the adaptive road-noise cancellation filter 118a may be proportional to the ratio of the power of accelerometer signal $a_1(n)$ the sum of the power of program content signals $u_1(n)$, $u_2(n)$ through $u_M(n)$, and accelerometer signals $a_1(n)$, through $a_L(n)$. Thus, the summed output of adaptive filter 302 will represent the estimated echo signal $\hat{d}(n)$ and the estimated road-noise component $\hat{v}_a(n)$, and the relative powers of the accelerometer signals and the content channels will be taken into account during the update, resulting in more accurate attribution of each program content channel 112 and accelerometer channel to the error.

Aside from combined multichannel adaptive filter 302, the structure and components of FIG. 3 functions largely the same as described in connection with FIG. 2, and thus do not require additional explanation.

Figure 4:
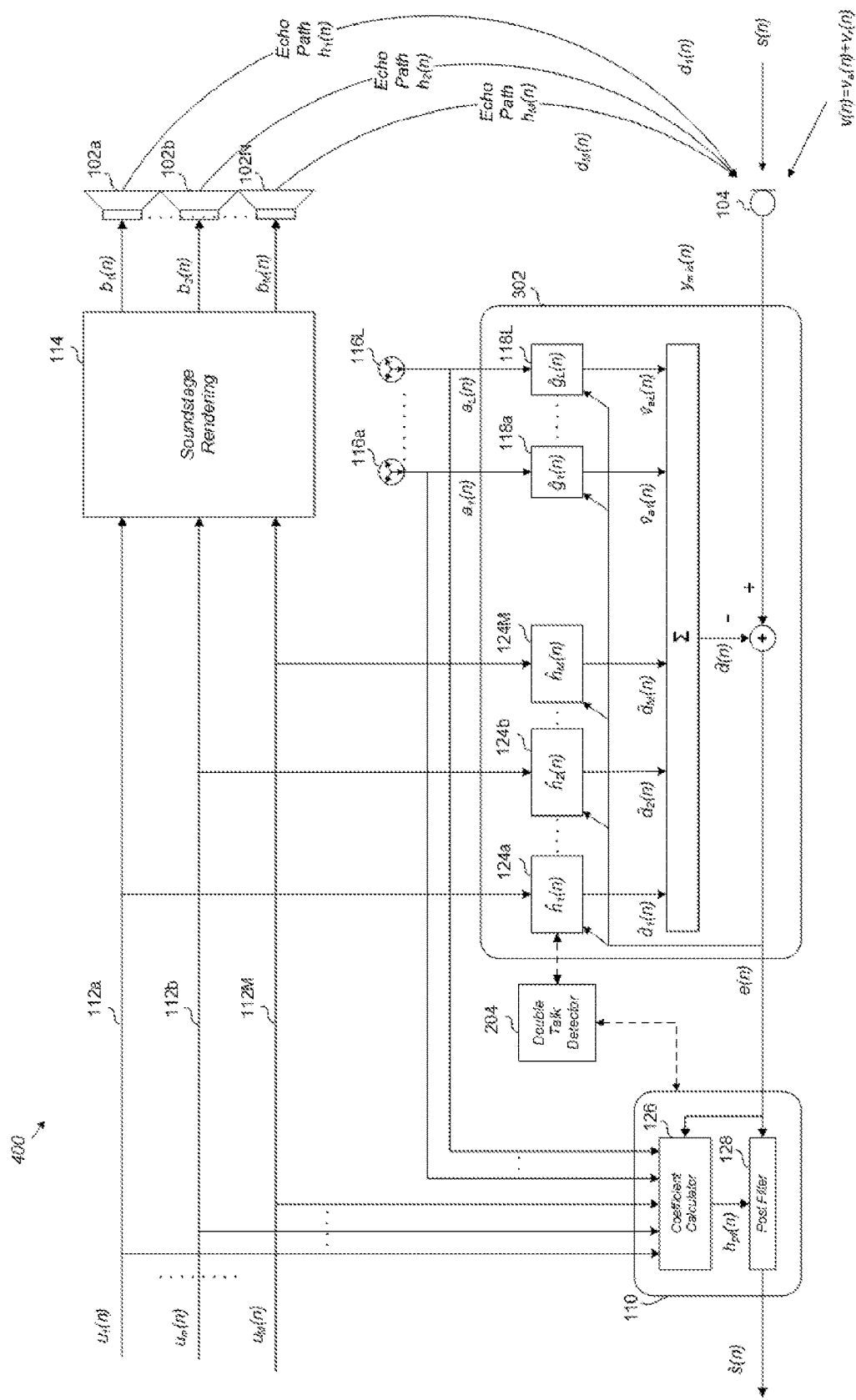
FIG. 4 depicts a schematic of an audio system including an adaptive road-noise canceler for canceling a road-noise component of a microphone signal combined with an echo canceler for canceling an echo component of a microphone signal, according to an example.

As shown in FIG. 4, the post filter subsystem may be further configured to receive the accelerometer signals a(n) as reference signals, in order to suppress the residual road noise present in the residual signal e(n), in addition to suppressing the residual echo in the residual signal e(n). One of ordinary skill in the art, in conjunction with reviewing this disclosure, will understand how to modify the post filter subsystem 110, and the equations described above, to suppress the residual road noise in the residual signal e(n).

Aside from combined post filter subsystem 110, modified to suppress road noise in the residual signal e(n), the structure and components of FIG. 4 functions largely the same as described in connection with FIG. 3, and thus do not require additional explanation. It should, however, be understood that in various alternative examples, the modified post filter subsystem 110 may be included to an audio system that does not feature the combined multichannel adaptive filter 302. For example, the modified post filter subsystem 110 may be included together with audio systems 100 and 200.

The road-noise canceller 106, echo canceler 108, and the post filter subsystem 110 may be configured to calculate the adaptive filter coefficients and the post filter subsystem 110 coefficients, respectively, only during periods when a double talk condition is not detected, e.g., by a double talk detector 204. As described above, when a user is speaking within the acoustic environment of the audio system 100, 200, 300, 400 the combined microphone signal $y_{mic}(n)$ includes a component that is the user's speech. In this case, the combined signal $y_{mic}(n)$ is not only representative of the echo from the acoustic transducers 102, and the residual signal e(n) is not representative of the residual echo, e.g., the mismatch of the echo canceler 108 relative to the actual echo path, because the user is speaking. Accordingly, the double talk detector 204 operates to indicate when double talk is detected, new coefficients may not be calculated during this period, and the coefficients in effect at the start or just prior to the user talking may be used while the user is talking. The double talk detector 204 may be any suitable system, component, algorithm, or combination thereof.

The output of audio system 100, 200, 300, 400, or any variations thereof (e.g., estimated voice signal ŝ(n)) may be provided to another subsystem or device for various applications and/or processing. Indeed, the audio system 100, 200, 300, 400 output may be provided for any application in which a noise-reduced voice signal is useful, including, for example, telephonic communication (e.g., providing the output to a far-end recipient via a cellular connection), virtual personal assistants, speech-to-text applications, voice recognition (e.g., identification), or audio recordings.

It should be understood that, in this disclosure, a capital letter used as an identifier or as a subscript represents any number of the structure or signal with which the subscript or identifier is used. Thus, channel 112M represents the notion that any number of channels 112 may be implemented in various examples. Indeed, in some examples, only one channel 112 may be implemented for one program content signal. Likewise, program content signal $u_M(n)$ represents the notion that any number of program content signals may be used. To the extent that different letters are used as subscripts, it is generally understood that those signals and structures may differ in number from other structures having different letters. Thus, there may be a different number of soundstage rendering outputs $b_N(n)$ than program content signals $u_M(n)$. It should, however, be understood that, in some examples, the same number of soundstage rendering outputs $b_N(n)$ and program content channels $u_M(n)$ may be used. Finally, it should be understood that, the same letter used for different signals or structures, e.g., program content signals $u_M(n)$ and estimated echo signals $\hat{d}_M(n)$, represents the general case in which there exists the same number of a particular signal or structure. Thus, in the general case, there will be the same number of estimated echo signals $\hat{d}_M(n)$ as program content signals $u_M(n)$ when the program content signals u(n) are used as a reference signal for echo canceler. The general case, however, should not be deemed limiting. A person of ordinary skill in the art will understand, in conjunction with a review of this disclosure, that, in certain examples, a different number of such signals or structures may be used. Thus, in certain examples (e.g., where certain program content signals u(n) are summed together to form a single reference for a single echo-cancellation filter 124) there may be a different number of estimated echo signals $\hat{d}_M(n)$ than program content signals $u_M(n)$.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An audio system, comprising:
an accelerometer positioned to produce an accelerometer signal representative of road noise within a vehicle cabin;
a microphone disposed within the vehicle cabin such that the microphone receives the road noise and produces a microphone signal having a road-noise component; and
a road-noise canceler, comprising a road-noise cancellation filter, configured to receive the accelerometer signal and the microphone signal and to minimize the road-noise component of the microphone signal according to the accelerometer signal, to produce an estimated microphone signal wherein the road-noise cancellation filter is included in a multi-channel adaptive filter further comprising an echo-cancellation filter configured to minimize an echo component of the microphone signal resulting from an acoustic production of at least one acoustic transducer disposed within the vehicle cabin.

2. The audio system of claim 1, wherein the road-noise cancellation filter is configured to provide an estimated road-noise signal, based on the accelerometer signal, wherein the road-noise canceler is configured to subtract the estimated road-noise signal from the microphone signal, such that the road-noise component of the microphone signal is minimized.

3. An audio system, comprising:
an accelerometer positioned to produce an accelerometer signal representative of road noise within a vehicle cabin;
a microphone disposed within the vehicle cabin such that the microphone receives the road noise and produces a microphone signal having a road-noise component; and
a road-noise canceler, comprising a road-noise cancellation filter, configured to receive the accelerometer signal and the microphone signal and to minimize the road-noise component of the microphone signal according to the accelerometer signal, to produce an estimated microphone signal, wherein the road-noise cancellation filter is an adaptive filter, configured to minimize an error signal, wherein the error signal is the estimated microphone signal.

4. An audio system, comprising:
an accelerometer positioned to produce an accelerometer signal representative of road noise within a vehicle cabin;
a microphone disposed within the vehicle cabin such that the microphone receives the road noise and produces a microphone signal having a road-noise component; and
a road-noise canceler, comprising a road-noise cancellation filter, configured to receive the accelerometer signal and the microphone signal and to minimize the road-noise component of the microphone signal according to the accelerometer signal, to produce an estimated microphone signal, wherein the road-noise cancellation filter is configured to receive the microphone signal and the accelerometer signal, the road-noise cancellation filter being optimized to minimize the road-noise component of the microphone signal according to the microphone signal and the accelerometer signal, wherein the road-noise canceler produces the estimated microphone signal without subtracting estimated road noise from the microphone signal.

5. The audio system of claim 4, further comprising an echo-cancellation filter configured to minimize an echo component of the estimated microphone signal, resulting from an acoustic production of at least one acoustic transducer disposed within the vehicle cabin, to produce a residual signal.

6. A method for canceling road noise in a microphone signal, comprising:
receiving from an accelerometer an accelerometer signal representative of road noise within a vehicle cabin;
receiving, from a microphone operably positioned within the vehicle cabin, the microphone signal having a road-noise component; and
minimizing, with a road-noise cancellation filter, the road-noise component of the microphone signal according to the accelerometer signal, to produce an estimated microphone signal, wherein the road-noise cancellation filter is included in a multi-channel adaptive filter further comprising an echo-cancellation filter configured to minimize an echo component of the microphone signal resulting from an acoustic production of at least one acoustic transducer disposed within the vehicle cabin.

7. The method of claim 6, wherein the step of minimizing comprises:
generating, with the road-noise cancellation filter, an estimated road-noise signal, based on at the accelerometer signal,
subtracting the estimated road-noise signal from the microphone signal, such that the road-noise component of the microphone signal is minimized.

8. A nontransitory storage medium storing program code that, when executed by a processor, comprises the steps of:
receiving from an accelerometer an accelerometer signal representative of road noise within a vehicle cabin;
receiving, from a microphone operably positioned within the vehicle, a microphone signal having a road-noise component; and
minimizing, with a road-noise cancellation filter, the road-noise component of the microphone signal according to the accelerometer signal, to produce an estimated microphone signal, wherein the road-noise cancellation filter is included in a multi-channel adaptive filter further comprising an echo-cancellation filter configured to minimize an echo component of the microphone signal resulting from an acoustic production of at least one acoustic transducer disposed within the vehicle cabin.

9. The nontransitory storage medium storing program code of claim 8, wherein the step of minimizing comprises:
generating, with the road-noise cancellation filter, an estimated road-noise signal, based on the accelerometer signal,
subtracting the estimated road-noise signal from the microphone signal, such that the road-noise component of the microphone signal is minimized.

* * * * *